United States Patent
Kim et al.

(10) Patent No.: US 9,911,975 B2
(45) Date of Patent: Mar. 6, 2018

(54) CARBON NANOTUBE-SULFUR COMPOSITE COMPRISING CARBON NANOTUBE AGGREGATES, AND METHOD FOR PREPARING SAME

(71) Applicant: LG CHEM, LTD., Seoul (KR)

(72) Inventors: Min Seo Kim, Daejeon (KR); Seong Ho Lee, Daejeon (KR); Minchul Jang, Daejeon (KR); Da Young Sung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/029,911

(22) PCT Filed: Oct. 8, 2014

(86) PCT No.: PCT/KR2014/009488
§ 371 (c)(1),
(2) Date: Apr. 15, 2016

(87) PCT Pub. No.: WO2015/056925
PCT Pub. Date: Apr. 23, 2015

(65) Prior Publication Data
US 2016/0248087 A1 Aug. 25, 2016

(30) Foreign Application Priority Data
Oct. 18, 2013 (KR) ........................ 10-2013-0124898

(51) Int. Cl.
| | |
|---|---|
| *H01M 4/36* | (2006.01) |
| *H01M 4/04* | (2006.01) |
| *H01M 4/136* | (2010.01) |
| *H01M 4/587* | (2010.01) |
| *H01M 4/133* | (2010.01) |
| *H01M 4/1393* | (2010.01) |
| *H01M 4/1397* | (2010.01) |
| *H01M 10/0525* | (2010.01) |
| *H01M 2/16* | (2006.01) |
| *H01M 4/134* | (2010.01) |
| *H01M 4/38* | (2006.01) |
| *H01M 4/62* | (2006.01) |
| *H01M 10/0568* | (2010.01) |
| *H01M 10/0569* | (2010.01) |
| *H01M 4/02* | (2006.01) |
| *H01M 10/058* | (2010.01) |

(52) U.S. Cl.
CPC ......... *H01M 4/366* (2013.01); *H01M 2/1653* (2013.01); *H01M 4/043* (2013.01); *H01M 4/0416* (2013.01); *H01M 4/133* (2013.01); *H01M 4/134* (2013.01); *H01M 4/136* (2013.01); *H01M 4/1393* (2013.01); *H01M 4/1397* (2013.01); *H01M 4/362* (2013.01); *H01M 4/38* (2013.01); *H01M 4/382* (2013.01); *H01M 4/587* (2013.01); *H01M 4/622* (2013.01); *H01M 4/625* (2013.01); *H01M 10/0525* (2013.01); *H01M 10/0568* (2013.01); *H01M 10/0569* (2013.01); *H01M 4/0404* (2013.01); *H01M 10/058* (2013.01); *H01M 2004/021* (2013.01); *H01M 2004/027* (2013.01); *H01M 2004/028* (2013.01); *H01M 2220/20* (2013.01); *H01M 2300/0028* (2013.01); *Y02T 10/7011* (2013.01)

(58) Field of Classification Search
CPC ........... H01M 10/0525; H01M 4/0416; H01M 4/043; H01M 4/38; H01M 4/366; H01M 4/382; H01M 4/133; H01M 4/134; H01M 4/136; H01M 4/587; H01M 4/622; H01M 4/625
See application file for complete search history.

(56) References Cited

U.S. PATENT DOCUMENTS

| | | | |
|---|---|---|---|
| 7,531,267 B2 * | 5/2009 | Kim ...................... | B82Y 30/00 252/182.1 |
| 2001/0034934 A1 | 11/2001 | Xu et al. | |
| 2004/0048154 A1 | 3/2004 | Jung et al. | |
| 2004/0241532 A1 | 12/2004 | Kim | |
| 2010/0009160 A1 | 1/2010 | Noguchi et al. | |
| 2010/0062229 A1 * | 3/2010 | Hata ...................... | B82Y 30/00 428/195.1 |
| 2010/0167053 A1 * | 7/2010 | Sung ................... | B01J 23/8892 428/402 |
| 2011/0171364 A1 * | 7/2011 | Xing .................... | B82Y 30/00 427/77 |
| 2011/0171371 A1 * | 7/2011 | Li .......................... | B82Y 30/00 427/122 |
| 2011/0262807 A1 * | 10/2011 | Boren ................... | B82Y 30/00 429/211 |

(Continued)

FOREIGN PATENT DOCUMENTS

| | | |
|---|---|---|
| CN | 101562244 A | 10/2009 |
| CN | 102185127 A * | 9/2011 |

(Continued)

OTHER PUBLICATIONS

Google translation of CN 102185127A, published on Sep. 14, 2011.*
Machine translation of JP 2007-234338, published on Sep. 13, 2007 (Year: 2007).*
International Search Report for Appl. No. PCT/KR2014/009488 dated Jan. 28, 2015 (w/ English translation).
Korean Office Action for Appl. No. 10-2014-0136118 dated Sep. 21, 2015 (w/ English translation).
Taiwan Office Action for Appl. No. 103135690 dated Dec. 24, 2015 (w/ English translation).
Extended European Search Report, dated Feb. 22, 2017, for European Application No. 14854127.9.

(Continued)

*Primary Examiner* — Anca Eoff
(74) *Attorney, Agent, or Firm* — Birch, Stewart, Kolasch & Birch, LLP

(57) ABSTRACT

The present application relates to a carbon nanotube-sulfur composite including a carbon nanotube aggregate, and a method for preparing the same.

16 Claims, 8 Drawing Sheets

(56) References Cited

U.S. PATENT DOCUMENTS

| | | | |
|---|---|---|---|
| 2012/0234694 A1* | 9/2012 | Vecitis | B01D 39/2055 205/747 |
| 2013/0004657 A1 | 1/2013 | Xu et al. | |
| 2013/0161557 A1 | 6/2013 | Chung | |
| 2013/0164620 A1 | 6/2013 | Woo et al. | |
| 2013/0209880 A1* | 8/2013 | Nozue | H01M 4/1393 429/211 |
| 2013/0224603 A1* | 8/2013 | Chen | B82Y 30/00 429/322 |
| 2014/0052322 A1 | 2/2014 | Takeshi | |
| 2014/0186695 A1* | 7/2014 | Moganty | H01M 4/1397 429/188 |
| 2014/0255292 A1 | 9/2014 | Wakizaka et al. | |

FOREIGN PATENT DOCUMENTS

| | | | |
|---|---|---|---|
| CN | 103247799 A | | 8/2013 |
| JP | H0748110 A | | 2/1995 |
| JP | 10-162811 A | | 6/1998 |
| JP | 2002-519826 | | 7/2002 |
| JP | 2004-103548 A | | 4/2004 |
| JP | 2007-234338 A | | 9/2007 |
| JP | 2007-527099 A | | 9/2007 |
| JP | 2011-63458 A | | 3/2011 |
| JP | 2012-238448 A | | 12/2012 |
| JP | 2013-137981 A | | 7/2013 |
| KR | 10-2001-0110410 A | | 12/2001 |
| KR | 10-2011-0110410 A | | 10/2011 |
| KR | 10-2013-0075621 A | | 7/2013 |
| KR | 10-2014-0091293 A | | 7/2014 |
| TW | 201328004 A | | 7/2013 |
| TW | 201336783 A | | 9/2013 |
| WO | WO 99/50922 | | 10/1999 |
| WO | WO 2010/004633 A1 | | 1/2010 |
| WO | WO2010/106287 | * | 9/2010 |
| WO | WO2012/070184 | * | 5/2012 |

OTHER PUBLICATIONS

Ji et al., "Porous Carbon Nanofiber-sulfur Composite Electrodes for Lithium/sulfur Cell," Energy Environ. Sci., vol. 4, No. 12, 2011 (Jan. 1, 2011), pp. 5053-5059, XP055261908.

Kim et al., "Synthesis and Characterization of Porous Carbon Nanofibers with Hollow Cores through the Thermal Treatment of Eiectrospun Copolymeric Nanofiber Webs," Small, vol. 3, No. 1, 2007 (Jan. 2, 2007), pp. 91-95 (Total 6 pages), XP055340569.

Pan et al., "Synthesis and Growth Mechanism of Carbon Nanotubes and Nanofibers from Ethanol Flames," Micron, vol. 35, No. 6, 2004 (Aug. 1, 2004), pp. 461-468, XP055340687.

Chakraborty et al., "Influence of Different Carbon Nanotubes on the Electrical and Mechanical Properties of Melt Mixed Poly(ether sulfone)-multi Walled Carbon Nanotube Composites", Composites Science and Technology, vol. 72 (2012) pp. 1933-1940.

* cited by examiner

[Figure 1]
a) Tangled type
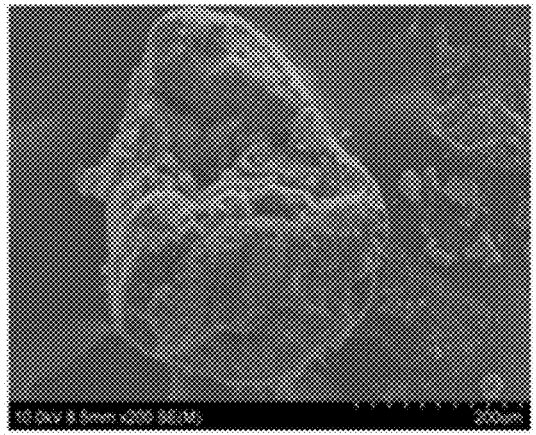
b) Entangle type
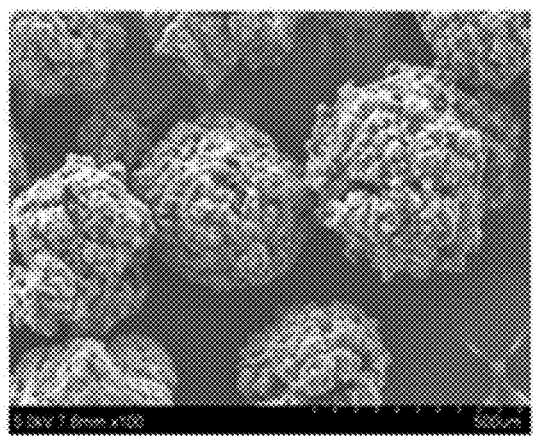
c) Bundle type
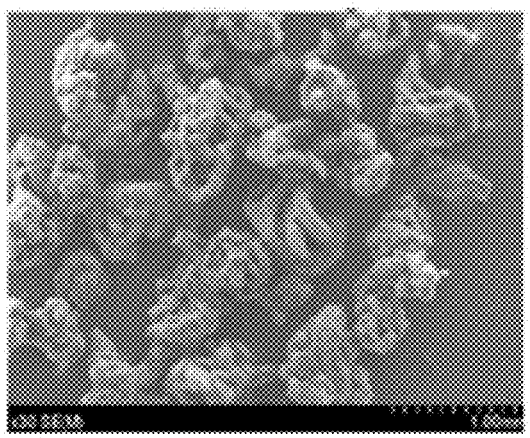

[Figure 2]

|  | a | b | c |
|---|---|---|---|
| CATALYST CONTENT (wt%) | 1.25 | 2.5 | 5 |
| TAP DENSITY (g/cc) | 0.27 | 0.07 | 0.026 |

[Figure 3]
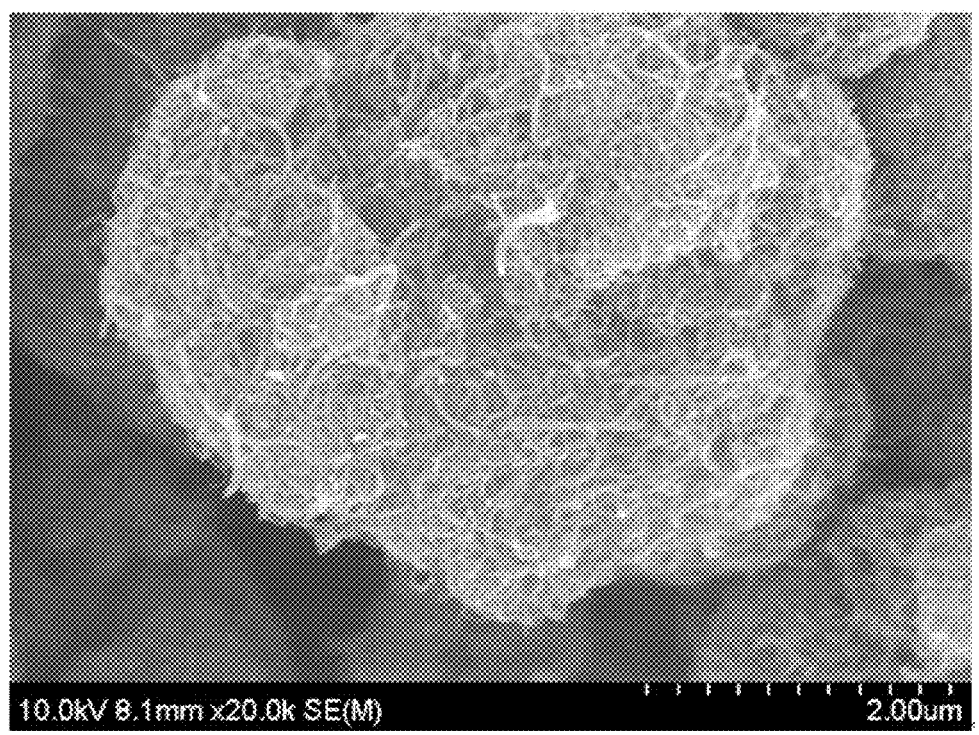

[Figure 4]
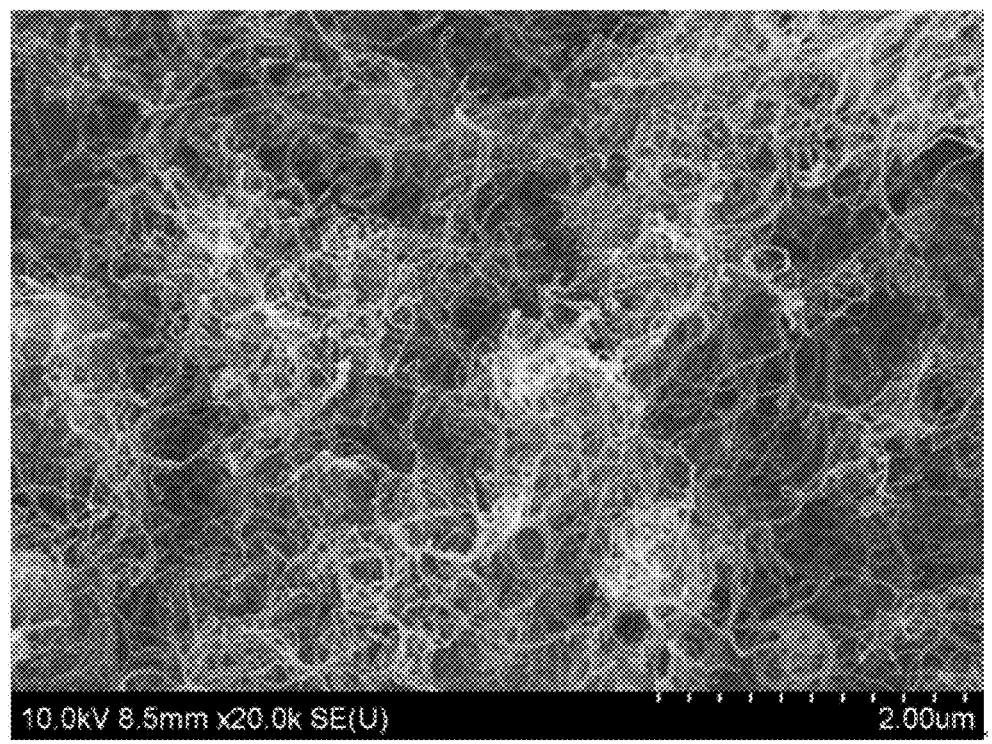

[Figure 5]
a) SHAPES OF BARE CNT(LEFT) AND SULFUR COATED CNT(RIGHT)
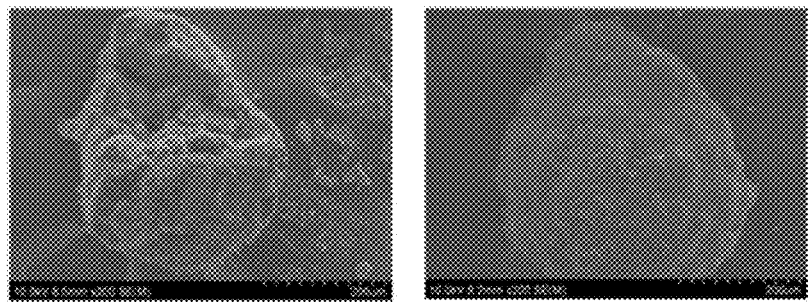
b) CROSS-SECTIONS OF BARE CNT(LEFT) AND SULFUR COATED CNT(RIGHT)
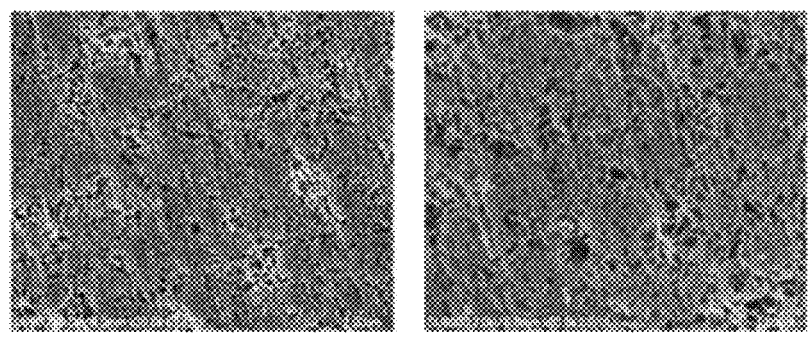
c) IMPREGNATION CROSS-SECTIONS OF SULFUR & CNT
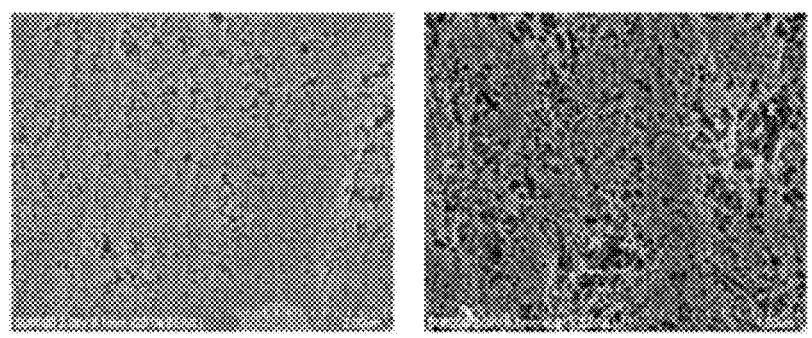
d) EDS MEASUREMENT:
IMPREGNATION CROSS-SECTIONS OF SULFUR & CNT
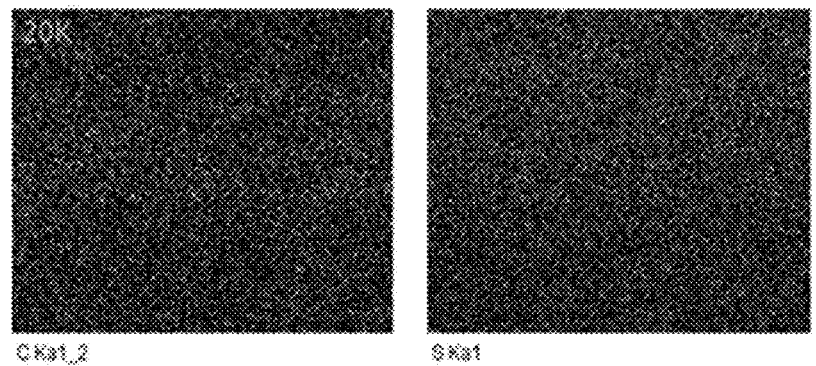

[Figure 6]
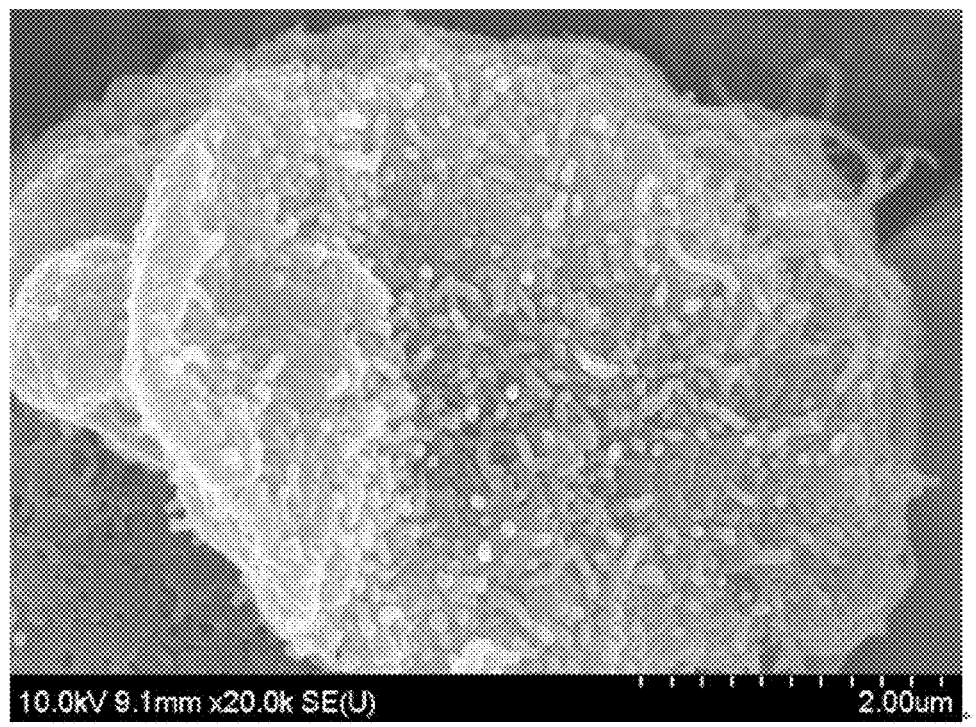

[Figure 7]
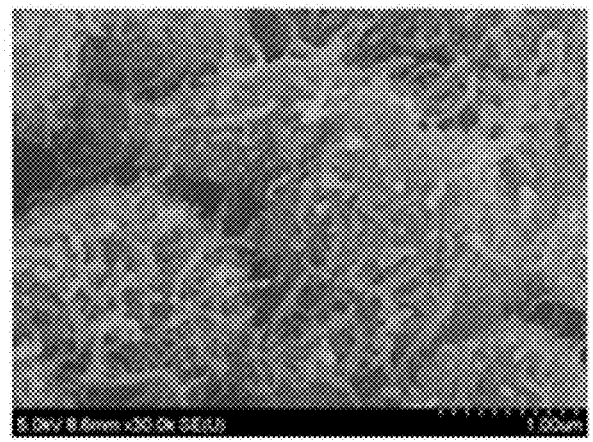
a. Sulfur : CNT = 5 : 5
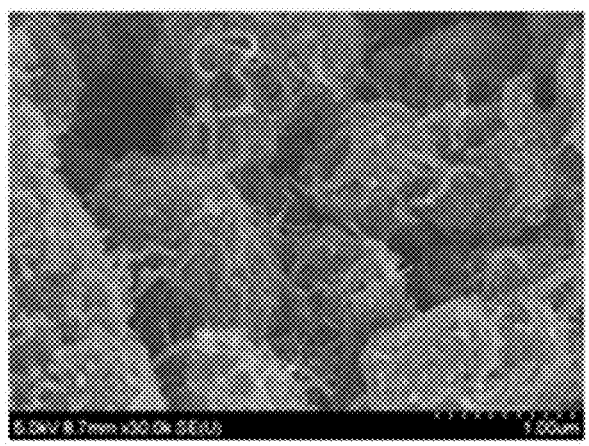
b. Sulfur : CNT = 7 : 3
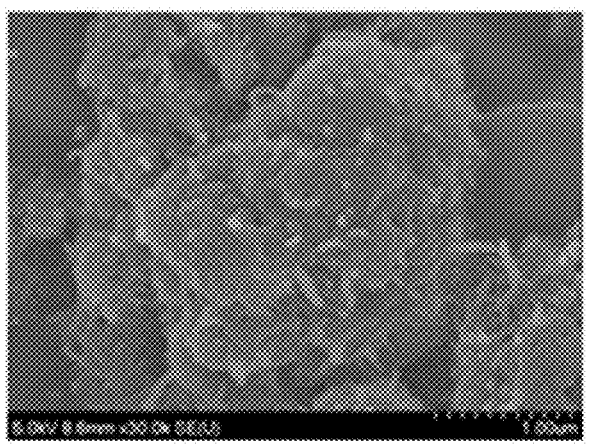
c. Sulfur : CNT = 9 : 1

[Figure 8]

|  | EXAMPLE 1 | EXAMPLE 2 | COMPARATIVE EXAMPLE 1 |
|---|---|---|---|
| SULFUR CONTENT IN ELECTRODE (mAh/cm$^2$) | 3 | 3 | 3 |
| DISCHARGING CAPACITY (mAh/g) | 1180 | 900 | 200 |

CARBON NANOTUBE-SULFUR COMPOSITE COMPRISING CARBON NANOTUBE AGGREGATES, AND METHOD FOR PREPARING SAME

TECHNICAL FIELD

This application claims priority from Korean Patent Application No. 10-2013-0124898 filed on Oct. 18, 2013, in the KIPO, the disclosure of which is incorporated herein by reference in its entirety.

The present application relates to a carbon nanotube-sulfur composite including a carbon nanotube aggregate, and a method for preparing the same.

BACKGROUND ART

A lithium-sulfur battery is a secondary battery where a sulfur-based compound having a sulfur-sulfur bond is used as a positive electrode active material and a carbon-based material in which intercalation and deintercalation of an alkali metal such as lithium or a metal ion such as a lithium ion occur is used as a negative electrode active material. Electric energy is stored and generated by using an oxidation-reduction reaction where an oxidation number of sulfur is reduced while the sulfur-sulfur bond is broken during discharging, which is a reduction reaction, and the sulfur-sulfur bond is formed again while the oxidation number of sulfur is increased during charging, which is an oxidation reaction.

In the lithium-sulfur battery, in the case where a lithium metal is used as the negative electrode active material, an energy density is 3830 mAh/g, and in the case where sulfur ($S_8$) is used as the positive electrode active material, the energy density is 1675 mAh/g, and thus the lithium-sulfur battery is a promising battery in terms of energy density. Further, there is a merit in that a sulfur-based material used as the positive electrode active material is a low-priced and environmentally-friendly material.

However, there is a problem in that since electric conductivity of sulfur is $5\times10^{-30}$ S/cm and thus sulfur is close to a nonconductor, it is difficult to move electrons generated by an electrochemical reaction. Accordingly, an electric conductive material such as a carbon providing a smooth electrochemical reaction site needs to be used. In this case, there are problems in that in the case where the conductive material and sulfur are simply mixed to be used, sulfur flows out to an electrolyte during the oxidation-reduction reaction to reduce a battery life-span, and in the case where an appropriate electrolytic solution is not selected, lithium polysulfide that is a reduction material of sulfur is eluted, and thus sulfur does not participate in the electrochemical reaction any more.

Therefore, in order to reduce an outflow of sulfur to the electrolyte and increase electronic conductivity of an electrode including the sulfur, a mixing quality of carbon and sulfur needs to be improved.

DISCLOSURE

Technical Problem

The present application has been made in an effort to provide a carbon nanotube-sulfur composite where a carbon nanotube can serve as an electron movement path and a contact site for sulfur by using an aggregation property of the carbon nanotube to improve electrode performance.

Further, the present application has been made in an effort to provide a method for preparing the carbon nanotube-sulfur composite.

The problems to be solved by the present application are not limited to the aforementioned technical problems, and other unmentioned technical problems may be clearly understood by a person with ordinary skill in the art from the following description.

Technical Solution

An exemplary embodiment of the present application provides a carbon nanotube-sulfur composite including: a carbon nanotube aggregate; and sulfur or a sulfur compound positioned on an external surface and in an inside of the carbon nanotube aggregate, in which a tap density of the carbon nanotube aggregate is 0.01 g/cc or more and 1 g/cc or less.

Another exemplary embodiment of the present application provides a method for preparing a carbon nanotube-sulfur composite, including: impregnating sulfur or a sulfur compound on an external surface and in an inside of a carbon nanotube aggregate, in which a tap density of the carbon nanotube aggregate is 0.01 g/cc or more and 1 g/cc or less.

Yet another exemplary embodiment of the present application provides a positive electrode for a lithium-sulfur battery, including: the carbon nanotube-sulfur composite.

Still another exemplary embodiment of the present application provides a lithium-sulfur battery including: a positive electrode for a lithium-sulfur battery, which includes the carbon nanotube-sulfur composite; a negative electrode; and a separation membrane positioned between the positive electrode and the negative electrode.

Still yet another exemplary embodiment of the present application provides a battery module including: the lithium-sulfur battery as a unit battery.

Advantageous Effects

A carbon nanotube-sulfur composite according to an exemplary embodiment of the present application has merits in that since a carbon nanotube serves as an electron movement path, electron conductivity can be increased, and a capacity of an electrode can be improved. Simultaneously, there are merits in that since the carbon nanotube can serve as a contact site for sulfur or a sulfur compound, even though sulfur or the sulfur compound is swollen by an electrolytic solution, separation of a carbon and sulfur or the sulfur compound does not occur, and thus flowing of sulfur or the sulfur compound into the electrolyte can be reduced and performance of a battery can be improved.

DESCRIPTION OF DRAWINGS

FIG. 1 is an image obtained by photographing carbon nanotube aggregates having various sizes and shapes by a scanning electron microscope (SEM).

FIG. 2 is a table obtained by measuring a tap density of the carbon nanotube aggregate which is generated when a carbon nanotube is grown according to a catalyst amount based on the total weight of the carbon nanotube.

FIGS. 3 and 4 are images obtained by photographing the carbon nanotube aggregate by a scanning electron microscope (SEM).

FIG. 5 is a photographed image of a carbon nanotube-sulfur composite having a shape of FIG. 1-a) obtained by a scanning electron microscope (SEM) and an energy dispersive spectroscopy (EDS).

FIG. 6 is a SEM image of the carbon nanotube-sulfur composite.

FIG. 7 is a SEM image of carbon nanotube-sulfur composites prepared in Preparation Examples 1 to 3.

FIG. 8 is a table obtained by measuring a discharging capacity of a lithium-sulfur battery including composites prepared in Preparation Example 1, Preparation Example 2, and Comparative Example 1 as a positive electrode.

MODE FOR INVENTION

Advantages and characteristics of the present application, and methods for achieving them will be apparent with reference to embodiments described below in detail in addition to the accompanying drawings. However, the present application is not limited to the exemplary embodiments to be disclosed below but may be implemented in various forms. Therefore, exemplary embodiments introduced herein are provided to make disclosed contents thorough and complete and sufficiently transfer the spirit of the present invention to those skilled in the art, and the present application is just defined by the scope of the appended claims. The sizes and the relative sizes of constituent elements shown in the drawings may be exaggerated for clarity of description.

Unless otherwise defined, all terms used herein, including technical or scientific terms, have the same meanings as those commonly understood by those skilled in the art to which the present application belongs. Further, terms defined in a generally used dictionary are not to be interpreted to have idealized or excessively formal meanings unless clearly defined in the present invention.

Hereinafter, the present application will be described in detail.

An exemplary embodiment of the present application provides a carbon nanotube-sulfur composite including a carbon nanotube aggregate; and sulfur or a sulfur compound positioned on an external surface and in an inside of the carbon nanotube aggregate, in which a tap density of the carbon nanotube aggregate is 0.01 g/cc or more and 1 g/cc or less.

The carbon nanotube aggregate means a linear conductive carbon aggregate, and specifically, a carbon nanotube aggregate (CNT), a graphite nanofiber (GNF), a carbon nanofiber (CNF), or an activated carbon fiber (ACF) may be used.

In the related art, the carbon nanotube-sulfur composite was prepared by using a method of performing acid treatment or pitch oxide treatment on a surface of the carbon nanotube to disperse the carbon nanotube into individual carbon nanotube particles, and then growing sulfur or the sulfur compound in an inside or on a surface of the carbon nanotube particle or applying sulfur or the sulfur compound on the inside and the outside thereof. Alternatively, the carbon-sulfur composite was prepared by artificially forming pores in a carbon to prepare a hollow carbon or a porous carbon. The aforementioned existing method had problems in that it was not easy to perform surface treatment on the carbon nanotube or artificially form the pores therein, it was difficult to prepare the composite particles having a uniform size, and it was difficult to perform mass production.

In the present specification, the carbon nanotube aggregate has a structure where many carbon nanotube strands are entangled, and a diameter of a cross-section of each carbon nanotube may be 1 nanometer or more and 100 nanometers or less.

In the present specification, the carbon nanotube aggregate has a structure where two or more carbon nanotube strands are physically or chemically bonded to be aggregated with cross points, and a diameter of the aggregate may be 500 micrometers or less.

In the present specification, in the carbon nanotube aggregate, a distance between the carbon nanotube particles may be several nanometers to several hundreds of nanometers and specifically 1 nanometer or more and less than 1000 nanometers.

Electron tunneling and electron pass are feasible on the surface and in the inside of the carbon nanotube-sulfur composite particle with the structure of the aggregate, and the carbon nanotube-sulfur composite particle can serve as a contact site of sulfur or the sulfur compound during charging and discharging due to many pores and a high specific surface area of the carbon nanotube aggregate itself. Further, there are merits in that even though sulfur or the sulfur compound is swollen by an electrolytic solution, separation of carbon and sulfur does not occur, and thus flowing of sulfur or the sulfur compound into the electrolyte may be reduced and performance of a battery may be improved.

In the composite, sulfur or the sulfur compound may be positioned only on the external surface and in the inside of the carbon nanotube aggregate.

Specifically, sulfur or the sulfur compound may be positioned in a region of less than 100% and more specifically a region of 50% to 80% of the entire external surface of the carbon nanotube aggregate. When sulfur or the sulfur compound is in the aforementioned range in the region of the entire external surface of the carbon nanotube aggregate, the maximum effect may be exhibited in terms of an electron transporting area and wettability of the electrolytic solution. In the aforementioned region, sulfur or the sulfur compound may be thinly impregnated in the carbon nanotube aggregate by a capillary phenomenon (capillary force) to increase an electron transporting contact area in charging and discharging processes.

In the case where sulfur or the sulfur compound is positioned in the region of 100% of the entire external surface of the carbon nanotube aggregate, the carbon nanotube aggregate is completely covered with sulfur or the sulfur compound to reduce wettability of the electrolytic solution, and a contact property with a conductive material included in an electrode, such that the carbon nanotube aggregate does not receive electrons, thereby not contributing to a reaction. That is, the case where sulfur or the sulfur compound is positioned on the entire external surface of the carbon nanotube aggregate is not preferable because an electron transporting role of the carbon nanotube is reduced.

A tap density of the carbon nanotube aggregate may be 0.01 g/cc or more and 1 g/cc or less. If the tap density of the carbon nanotube aggregate is less than 0.01 g/cc, an addition amount of a binder and a solvent per unit volume is increased, and thus a content of sulfur or the sulfur compound may be reduced to reduce a capacity of a battery. If the tap density of the carbon nanotube aggregate is more than 1 g/cc, there are problems in that an air porosity between the carbon nanotube aggregates in the electrode is rapidly reduced to aggregate the impregnated sulfur or sulfur compounds and thus reduce wettability for the electrolytic solution and make it difficult to transport electrons. Moreover, there are problems in that since sulfur or the sulfur compound is reacted to generate $Li_2S$ and increase a volume, if the tap density is more than 1 g/cc, an air porosity is further reduced to cause a problem in durability of the electrode and reduce the capacity.

In the exemplary embodiment of the present application, the tap density may be adjusted by changing a catalyst amount when the carbon nanotube is grown in the preparing of the carbon nanotube. A detailed description will be provided later.

In the present specification, the tap density may be measured by a method generally used in the art as a method for measuring the degree of filling of a sample per unit volume. For example, the tap density may be an apparent density obtained by mechanically tapping a vessel for measurement, into which the sample is put, until a volume change amount is within 2%.

In the carbon nanotube-sulfur composite according to the present application, sulfur or the sulfur compound may be uniformly impregnated in a larger amount in the carbon nanotube as compared to an existing method of dispersing carbon nanotube particles to grow sulfur as a seed or apply sulfur on a surface, by using the carbon nanotube aggregate. Accordingly, the content (loading) of sulfur or the sulfur compound per unit volume may be increased to increase the capacity of the electrode.

A shape of the carbon nanotube aggregate may be a sphere or an oval. In the present specification, a diameter of the carbon nanotube aggregate means the largest value of diameters of cross-sections of the aggregates.

In the carbon nanotube-sulfur composite, the diameter of the carbon nanotube aggregate may be 1 micrometer or more and 500 micrometers or less, specifically 1 micrometer or more and 100 micrometers or less, more specifically 1 micrometer or more and 50 micrometers or less, and even more specifically 1 micrometer or more and 10 micrometers or less.

If the diameter of the carbon nanotube aggregate is more than 500 micrometers, electrode uniformity is reduced and many pores between the particles are generated to reduce the content of sulfur or the sulfur compound and reduce a contact area with a current collector. Therefore, in order to provide appropriate pore and electrode uniformity, it is preferable that the diameter of the carbon nanotube aggregate be 500 micrometers or less.

In sulfur or the sulfur compound, sulfur may mean a sulfur element ($S_8$), and the sulfur compound may be a sulfur compound having a sulfur bond having a small length or an S—S bond such as sulfur bonded to a polymer.

In the carbon nanotube-sulfur composite, a content ratio of the carbon nanotube aggregate and sulfur or the sulfur compound may be 10 to 50:50 to 90 based on wt %. If the content of sulfur or the sulfur compound is less than 50 wt %, the content of the carbon nanotube aggregate is increased, and a specific surface area is increased as the content of the carbon is increased, and thus an addition amount of the binder needs to be increased when a slurry is prepared. An increase in addition amount of the binder may eventually increase surface resistance of the electrode and serve as an insulator preventing electron pass to reduce cell performance. If the content of sulfur or the sulfur compound is more than 90 wt %, since the sulfurs or the sulfur compounds that are not bonded to the carbon nanotube aggregate are aggregated with each other or are re-eluted to the surface of the carbon nanotube aggregate, it is difficult to receive the electrons, and thus it may be difficult for sulfur or the sulfur compound to directly participate in an electrode reaction.

In the carbon nanotube-sulfur composite, the carbon nanotube aggregate may have a porosity of 10% or more and 70% or less and more specifically 10% or more and 40% or less based on the total volume of the aggregate. It is preferable that the carbon nanotube aggregate having the porosity in the aforementioned range be used in forming the carbon nanotube-sulfur composite.

In this case, the porosity of the inside may be adjusted by including a metal catalyst or a metal oxide catalyst in the content of 0.1 wt % or more and 10 wt % or less based on the total weight of the carbon nanotube aggregate to grow the carbon nanotube aggregate when the carbon nanotube aggregate is prepared. The metal catalyst may be Fe, Ni, Co, Cr, Ni/Ti, Co/Ti, Fe/Ti, or the like. The metal oxide catalyst may be $Fe_2O_3$, $Al_2O_3$, and CuO. The porosity of the carbon nanotube aggregate and the length and the shape of the carbon nanotube may be adjusted by adjusting the kind and the content of the metal catalyst or the metal oxide catalyst. As the amount of the catalyst is reduced, the density of the inside of the carbon nanotube aggregate may be increased and the particle may have a skein shape, and as the amount of the catalyst is increased, the particle of the inside of the carbon nanotube aggregate may be linear and the density of the inside may be reduced. Accordingly, as described above, when the carbon nanotube aggregate is prepared, the tap density of the carbon nanotube aggregate may be adjusted by adjusting the catalyst amount.

According to the exemplary embodiment of the present application, the tap density of the carbon nanotube-sulfur composite is preferably 0.1 g/cc or more and 3 g/cc, but is not limited thereto. The tap density may be changed by adjusting the content of sulfur or the sulfur compound if necessary.

The composite is a matter where sulfur or the sulfur compound is impregnated in the carbon nanotube, and when sulfur or the sulfur compound is impregnated in the carbon nanotube aggregate, there is little change in particle size. The impregnation may be performed by uniformly mixing the carbon nanotube aggregate and sulfur or the sulfur compound, and then applying sulfur or the sulfur compound along the carbon nanotube aggregate at a temperature of a melting point of sulfur or more by a capillary phenomenon.

One exemplary embodiment of the present application provides a method for preparing a carbon nanotube-sulfur composite, including: impregnating sulfur or a sulfur compound on an external surface and in an inside of a carbon nanotube aggregate (S10), in which a tap density of the carbon nanotube aggregate is 0.01 g/cc or more and 1 g/cc or less.

The method for preparing the carbon nanotube-sulfur composite may further include preparing the carbon nanotube aggregate (S01) before the impregnating of sulfur or the sulfur compound.

The preparing of the carbon nanotube aggregate (S01) may include preparing a carbon nanotube, and in the preparing of the carbon nanotube, a catalyst amount may be 0.1% to 10% and specifically 1% to 5% based on the total weight of the generated carbon nanotube. When the catalyst amount is within the aforementioned range, the tap density and the air porosity of the carbon nanotube aggregate may be appropriately adjusted.

The method for preparing the carbon nanotube may be represented by a method for growing the carbon nanotube.

The method for preparing the carbon nanotube is not limited, and a method used in the art may be used. Further, the kind of catalyst is not limited, and a general catalyst used in the art may be used.

The catalyst may be a metal catalyst or a metal oxide catalyst.

The metal catalyst may be Fe, Ni, Co, Cr, Ni/Ti, Co/Ti, Fe/Ti, or the like.

The metal oxide catalyst may be $Fe_2O_3$, $Al_2O_3$, and CuO.

As described above, the porosity of the carbon nanotube aggregate and the length and the shape of the carbon nanotube may be adjusted by adjusting the kind and the content of the metal catalyst or the metal oxide catalyst. As the catalyst amount is reduced, the density of the inside of the carbon nanotube aggregate may be increased and the particle may have a skein shape, and as the catalyst amount is increased, the particle of the inside of the carbon nanotube aggregate may be linear and the density of the inside may be reduced. Accordingly, as described above, when the carbon nanotube aggregate is prepared, the tap density of the carbon nanotube aggregate may be adjusted by adjusting the catalyst amount.

Referring to FIGS. 1 and 2, FIG. 1 illustrates the carbon nanotubes prepared by changing the catalyst amount, and it can be confirmed that when the catalyst is used in an amount of (a) 1.25 wt %, (b) 2.5 wt %, and (c) 5 wt %, the shapes of the carbon nanotube aggregates are different from each other, and in FIG. 2, a change in tap density according to the catalyst amount can be confirmed.

In the carbon nanotube-sulfur composite prepared by the aforementioned preparing method, after adjusting the size, the carbon nanotube aggregate may have a porosity of 10% or more and 70% or less and more specifically 10% or more and 40% or less based on the total volume of the aggregate. It is preferable that the carbon nanotube aggregate having the porosity in the aforementioned range be used in forming the carbon nanotube-sulfur composite.

In this case, as an initial carbon nanotube aggregate used in the aforementioned preparing method, a matter where the porosity of the inside is adjusted by including the metal catalyst or the metal oxide catalyst in the content of 0.1 wt % or more and 10 wt % or less based on the total weight of the carbon nanotube aggregates to grow the carbon nanotube aggregates may be used. The metal oxide catalyst may be $Fe_2O_3$, $Al_2O_3$, or CuO. The porosity of the carbon nanotube aggregate and the length and the shape of the carbon nanotube may be adjusted by adjusting the kind and the content of the metal catalyst or the metal oxide catalyst. As the catalyst amount is reduced, the density of the inside of the carbon nanotube aggregate may be increased and the particle may have a skein shape, and as the catalyst amount is increased, the particle of the inside of the carbon nanotube aggregate may be linear and the density of the inside may be small.

The size of the carbon nanotube aggregate used when the carbon nanotube-sulfur composite is prepared may be 1 micrometer or more and 500 micrometers or less, specifically 1 micrometer or more and 100 micrometers or less, more specifically 1 micrometer or more and 50 micrometers or less, and even more specifically 1 micrometer or more and 10 micrometers or less. The size of the carbon nanotube aggregate is at a level that can be arbitrarily adjusted, and in the present application, the maximum size at which the carbon nanotube aggregate can be used as the electrode is set to 500 micrometers. This is set in consideration of an increase in loading amount of the electrode, a change in electrode structure, and the purpose thereof. If the diameter of the carbon nanotube aggregate is more than 500 micrometers, electrode uniformity is reduced and many pores between the particles are generated to reduce the content of sulfur or the sulfur compound and thus reduce a contact area with a current collector. Therefore, in order to have the appropriate porosity and electrode uniformity, it is preferable that the diameter of the carbon nanotube aggregate be 500 micrometers or less.

The method for preparing the carbon nanotube-sulfur composite may further include adjusting the size of the diameter of the carbon nanotube aggregate to 50 micrometers or less (S20) before, after, or before and after the impregnating of sulfur or the sulfur compound.

Specifically, the aforementioned preparing method may include impregnating sulfur or the sulfur compound on the external surface and in the inside of the carbon nanotube aggregate (S10); and adjusting the size of the diameter of the carbon nanotube aggregate to 50 micrometers or less (S20) after the impregnating of sulfur or the sulfur compound.

Specifically, the aforementioned preparing method may include adjusting the size of the diameter of the carbon nanotube aggregate to 50 micrometers or less (S20); and impregnating sulfur or the sulfur compound on the external surface and in the inside of the carbon nanotube aggregate (S10) after the adjusting of the size.

Specifically, the aforementioned preparing method may include adjusting the size of the carbon nanotube aggregate (S30); impregnating sulfur or the sulfur compound on the external surface and in the inside of the carbon nanotube aggregate (S10) after the adjusting of the size; and adjusting the size of the carbon nanotube aggregate (S40) after the impregnating, and in any one of steps S30 and S40, the diameter of the carbon nanotube aggregate may be adjusted to 50 micrometers or less.

In steps S30 and S40, the diameter of the carbon nanotube aggregate is not just stated, and steps S30 and S40 may be interpreted to be the same as step S20.

It is more preferable that the adjusting of the size be performed before sulfur or the sulfur compound is impregnated.

In the adjusting of the size (S20), the diameter of the carbon nanotube aggregate may be specifically 1 micrometer or more and 50 micrometers or less and more specifically 1 micrometer or more and 10 micrometers or less. If the diameter of the carbon nanotube aggregate is more than 50 micrometers, the surface may be in a nonuniform state during printing and scratches may be formed in a separation membrane when a cell is manufactured, and thus it is preferable that the diameter be 50 micrometers or less.

The adjusting of the size (S20) may be performed by using a dry ball mill method, a dry jet mill method, or a dry Dyno mill method.

The impregnating of sulfur or the sulfur compound (S10) may be performed by uniformly mixing the carbon nanotube aggregate and sulfur or sulfur compound powder, and then heating a mixture to impregnate the molten sulfur or sulfur compound in the carbon nanotube aggregate. In this case, sulfur or the sulfur compound may flow into the carbon nanotube therearound by a capillary phenomenon to be applied.

A heating temperature may be 115° C. or more and 180° C. or less and more specifically 150° C. or more and 160° C. or less. Referring to FIG. 6, it can be confirmed that sulfur is uniformly applied around the carbon nanotube rather than pores between the carbon nanotubes through an EDS (energy dispersive spectroscopy) analysis.

A heating time may be adjusted according to the contents of sulfur or the sulfur compound and the carbon nanotube aggregate, and for example, may be 10 seconds or more or 30 seconds or more and 2 hours or less, 1 hour or less, 30 minutes or less, or 10 minutes or less.

In the case where a melting temperature is less than 115° C., since sulfur or sulfur compound particles are not melted, sulfur or the sulfur compound may not be well impregnated in the carbon nanotube aggregate.

The impregnating of sulfur or the sulfur compound (S10) may be performed by dissolving sulfur or the sulfur compound in an organic solvent and then adding the carbon nanotube aggregate to grow sulfur or the sulfur compound.

The organic solvent may be one or a mixture solvent of two or more selected from the group consisting of ethanol, toluene, benzene, N-methyl-2-pyrrolidone (NMP), dimethyl sulfoxide (DMSO), acetone, chloroform, dimethylformamide, cyclohexane, tetrahydrofuran, and methylene chloride.

The impregnating of sulfur or the sulfur compound (S10) may be performed by mixing the carbon nanotube aggregate and sulfur or sulfur compound powder and then performing impregnating by the ball mill method.

A mixing method may be performed by putting the carbon nanotube aggregate and sulfur or sulfur compound powder into a powder mixer for a predetermined time. In this case, a mixing time may be 10 minutes or more or 30 minutes or more and 10 hours or less, 5 hours or less, or 2 hours or less.

In the method for preparing the carbon nanotube-sulfur composite, a content ratio of the carbon nanotube aggregate and sulfur or the sulfur compound may be 10 to 50:50 to 90 based on wt %.

One exemplary embodiment of the present application provides a carbon nanotube-sulfur composite prepared by the aforementioned preparing method.

One exemplary embodiment of the present application provides a positive electrode for a lithium-sulfur battery, including the carbon nanotube-sulfur composite. The carbon nanotube-sulfur composite may be included as the positive electrode active material in the positive electrode.

The positive electrode may further include, in addition to the positive electrode active material, one or more additives selected from a transition metal element, a Group IIIA element, a Group IVA element, a sulfur compound of the elements, and an alloy of the elements and the sulfur.

The transition metal element may include Sc, Ti, V, Cr, Mn, Fe, Co, Ni, Cu, Zn, Y, Zr, Nb, Mo, Tc, Ru, Rh, Pd, Os, Ir, Pt, Au, Hg, or the like, the Group IIIA element may include Al, Ga, In, Ti, or the like, and the Group IVA element may include Ge, Sn, Pb, or the like.

The positive electrode may further include an electric conductive material for smoothly moving electrons in the positive electrode and a binder for well attaching the positive electrode active material to the current collector.

The positive electrode active material used in the positive electrode is the carbon nanotube-sulfur composite according to the present application.

The conductive material is not particularly limited as long as the conductive material has conductivity while not causing a chemical change in the battery, but a graphite-based material such as KS6; carbon black such as Super-P, Denka black, acetylene black, Ketjen black, channel black, furnace black, lamp black, summer black, and carbon black; a carbon derivative such as a carbon nanotube or fullerene; conductive fibers such as carbon fibers or metal fibers; a metal powder such as carbon fluoride, aluminum, or nickel powder; or a conductive polymer such as polyaniline, polythiophene, polyacetylene, and polypyrrole may be used alone or used while being mixed.

The conductive material may be added in the content of 0.01 wt % to 30 wt % based on the total weight of the mixture including the positive electrode active material.

As the binder, poly(vinyl acetate), polyvinyl alcohol, polyethylene oxide, polyvinyl pyrrolidone, alkylated polyethylene oxide, cross-linked polyethylene oxide, polyvinyl ether, poly(methyl methacrylate), polyvinylidene fluoride, a copolymer of polyhexafluoropropylene and polyvinylidene fluoride (trade name: Kynar), poly(ethyl acrylate), polytetrafluoroethylenepolyvinyl chloride, polyacrylonitrile, polyvinylpyridine, polystyrene, a derivative, a blend, and a copolymer thereof, and the like may be used.

The binder may be added in the content of 0.5 wt % to 30 wt % based on the total weight of the mixture including the positive electrode active material. If the content of the binder is less than 0.5 wt %, physical properties of the positive electrode may be reduced to cause deintercalation of the active material and the conductive material in the positive electrode, and if the content is more than 30 wt %, a ratio of the active material and the conductive material in the positive electrode may be relatively reduced to reduce a battery capacity.

Specifically reviewing the method for preparing the positive electrode of the present application, first, the binder is dissolved in a solvent for preparing a slurry, and the conductive material is then dispersed. As the solvent for preparing the slurry, it is preferable to use a matter that can uniformly disperse the positive electrode active material, the binder, and the conductive material and is easily vaporized, and representatively, acetonitrile, methanol, ethanol, tetrahydrofuran, water, isopropyl alcohol, and the like may be used. Next, the positive electrode active material, or selectively, together with the additive, is uniformly dispersed again in the solvent where the conductive material is dispersed to prepare a positive electrode slurry. The amount of the solvent, the positive electrode active material, or selectively, the additive included in the slurry does not have a particularly important meaning in the present application, but the amount is sufficient as long as an appropriate viscosity is secured so as to easily apply the slurry.

The prepared slurry is applied on the current collector, and dried under the vacuum to form the positive electrode. The slurry may be applied in an appropriate thickness on the current collector according to the viscosity of the slurry and the thickness of the positive electrode to be formed.

The current collector is not particularly limited as long as the current collector can be generally formed in a thickness of 3 micrometers to 500 micrometers, does not cause a chemical change in the battery, and has high conductivity. Specifically, a conductive material such as stainless steel, aluminum, copper, and titanium may be used, and more specifically a carbon-coated aluminum current collector may be used. The use of the carbon-coated aluminum substrate has merits in that adhesion strength to the active material is excellent, contact resistance is low, and corrosion of aluminum by polysulfide is prevented as compared to a matter not coated with a carbon. The current collector can be formed in various types such as a film, sheet, a foil, a net, a porous body, a foaming body, or a non-woven fabric body.

One exemplary embodiment of the present application provides a lithium-sulfur battery including a positive electrode including the carbon nanotube-sulfur composite; a negative electrode; and a separation membrane positioned between the positive electrode and the negative electrode.

The lithium-sulfur battery may include a positive electrode including a carbon nanotube-sulfur composite as a positive electrode active material; a negative electrode including a lithium metal or a lithium alloy as the negative electrode active material; a separation membrane positioned between the positive electrode and the negative electrode;

and an electrolyte impregnated in the negative electrode, the positive electrode, and the separation membrane and including a lithium salt and an organic solvent.

In the negative electrode, as the negative electrode active material, a material that can reversibly perform intercalation or deintercalation of lithium ions, a material that can be reacted with the lithium ions to reversibly form a lithium-containing compound, a lithium metal, or a lithium alloy may be used.

The material that can reversibly perform intercalation or deintercalation of the lithium ions may be, for example, crystalline carbon, amorphous carbon, or a mixture thereof.

The material that can be reacted with the lithium ions to reversibly form the lithium-containing compound may be, for example, tin oxide, titanium nitrate, or silicon.

The lithium alloy may be, for example, an alloy of lithium and a metal selected from the group consisting of Na, K, Rb, Cs, Fr, Be, Mg, Ca, Sr, Ba, Ra, Al, and Sn.

The separation membrane positioned between the positive electrode and the negative electrode is a matter that can separate or insulate the positive electrode and the negative electrode from each other and make it possible to transport the lithium ions between the positive electrode and the negative electrode, and may be formed of a porous non-conductive or insulating material. The separation membrane may be an independent member such as a film, or a coating layer added to the positive electrode and/or the negative electrode.

Examples of the material forming the separation membrane include polyolefine such as polyethylene and polypropylene, a glass fiber filtering paper, and a ceramic material, but are not limited thereto, and a thickness thereof may be about 5 micrometers to about 50 micrometers and particularly about 5 micrometers to about 25 micrometers.

The electrolyte impregnated in the negative electrode, the positive electrode, and the separation membrane includes the lithium salt and the organic solvent.

A concentration of the lithium salt may be 0.2 M to 2 M, specifically 0.6 M to 2 M, and more specifically 0.7 M to 1.7 M according to various factors such as a precise composition of an electrolyte solvent mixture, solubility of the salt, conductivity of the dissolved salt, a charging and discharging condition of the battery, an operation temperature, and other factors publicly known in a lithium battery field. If the lithium salt is used at the concentration of less than 0.2 M, conductivity of the electrolyte may be reduced to reduce performance of the electrolyte, and if the lithium salt is used at the concentration of more than 2 M, the viscosity of the electrolyte may be increased to reduce mobility of the lithium ions. Examples of the lithium salt to be used in the present application may include one or more selected from the group consisting of $LiSCN$, $LiBr$, $LiI$, $LiPF_6$, $LiBF_4$, $LiSO_3CF_3$, $LiClO_4$, $LiSO_3CH_3$, $LiB(Ph)_4$, $LiC(SO_2CF_3)_3$, and $LiN(SO_2CF_3)_2$.

A single solvent may be used or a mixture organic solvent of two or more thereof may be used as the organic solvent. In the case where the mixture organic solvent of two or more thereof is used, it is preferable to select and use one or more solvents from two or more groups of a weak polar solvent group, a strong polar solvent group, and a lithium metal protection solvent group.

The weak polar solvent is defined as a solvent that can dissolve a sulfur element among an aryl compound, bicyclic ether, and non-cyclic carbonate and has a dielectric constant of less than 15, the strong polar solvent is defined as a solvent that can dissolve lithium polysulfide among bicyclic carbonate, a sulfoxide compound, a lactone compound, a ketone compound, an ester compound, a sulfate compound, and a sulfite compound and has a dielectric constant of more than 15, and the lithium metal protection solvent is defined as a solvent that forms a stable SEI (solid electrolyte interface) on the lithium metal, such as a saturated ether compound, an unsaturated ether compound, and a heterocyclic compound including N, O, S, or a combination thereof and has charging and discharging cycle efficiency of 50% or more.

Specific examples of the weak polar solvent include xylene, dimethoxyethane, 2-methyltetrahydrofuran, diethyl carbonate, dimethyl carbonate, toluene, dimethyl ether, diethyl ether, diglyme, tetraglyme, or the like.

Specific examples of the strong polar solvent include hexamethyl phosphoric triamide, γ-butyrolactone, acetonitrile, ethylene carbonate, propylene carbonate, N-methylpyrrolidone, 3-methyl-2-oxazolidone, dimethyl formamide, sulforane, dimethyl acetamide, dimethyl sulfoxide, dimethyl sulfate, ethylene glycol diacetate, dimethyl sulfite, ethylene glycol sulfite, or the like.

Specific examples of the lithium protection solvent include tetrahydrofuran, ethylene oxide, dioxolane, 3,5-dimethyl isoxazol, furan, 2-methyl furan, 1,4-oxane, 4-methyldioxolane, or the like.

One exemplary embodiment of the present application provides a battery module including the lithium-sulfur battery as a unit battery.

The battery module may be specifically used as a power source of an electric vehicle, a hybrid electric vehicle, a plug-in hybrid electric vehicle, or electric power storage system.

Hereinafter, the present application will be described in detail with reference to Examples and Comparative Examples. However, the Examples according to the present application may be modified in various other forms, and the scope of the present application is not interpreted to be limited to the Examples as will be described in detail below. The Examples of the present application are provided to more fully describe the present application to the person with ordinary skill in the art.

<Preparation Example 1 of Carbon Nanotube>
Preparation of Carbon Nanotube 1

The carbon nanotube were grown using the catalyst in an amount of 1.25% based on the total weight of the generated carbon nanotube. Accordingly, the carbon nanotube aggregate having the tap density of 0.27 g/cc was prepared.

<Preparation Example 2 of Carbon Nanotube>
Preparation of Carbon Nanotube 2

The carbon nanotube were grown using the catalyst in an amount of 2.5% based on the total weight of the generated carbon nanotube. Accordingly, the carbon nanotube aggregate having the tap density of 0.07 g/cc was prepared.

<Preparation Example 3 of Carbon Nanotube>
Preparation of Carbon Nanotube 3

The carbon nanotube were grown using the catalyst in an amount of 5% based on the total weight of the generated carbon nanotube. Accordingly, the carbon nanotube aggregate having the tap density of 0.026 g/cc was prepared.

The analysis results of the carbon nanotube aggregates prepared in Preparation Examples 1 to 3 of the carbon nanotube are illustrated in FIGS. 1 and 2.

FIG. 1 is an image obtained by photographing the carbon nanotube aggregates having various sizes and shapes by a scanning electron microscope (SEM). In the Preparation Examples of the carbon nanotube, it can be confirmed that the size and the shape of the carbon nanotube aggregate can be adjusted by adjusting the catalyst amount.

Specifically, FIG. 1 illustrates the carbon nanotube prepared by changing the catalyst amount, and it can be confirmed that when the catalyst is used in the amount of (a) 1.25 wt %, (b) 2.5 wt %, and (c) 5 wt %, the shapes of the carbon nanotube aggregates are different from each other, and in FIG. 2, a change in tap density according to a change in catalyst amount can be confirmed.

<Preparation Example 1> Preparation of Carbon Nanotube-Sulfur Composite 1

The size of the 100 g of the carbon nanotube aggregate having the average diameter of 500 micrometers, the specific surface area (BET measurement) of 180 $m^2/g$, and the tap density of 0.27 g/cc was adjusted to form the carbon nanotube aggregate having the average particle diameter of 10 micrometers by using the dry jet mill. In this case, the tap density of the carbon nanotube aggregate was 0.40 g/cc. 50 g of the carbon nanotube aggregate having the adjusted size and 50 g of the sulfur powder having the diameter of 1 micrometer to 10 micrometers were uniformly mixed, and subjected to heat treatment in the oven at 150° C. to impregnate sulfur in the carbon nanotube aggregate. Accordingly, the carbon nanotube-sulfur composite was prepared.

<Preparation Example 2> Preparation of Carbon Nanotube-Sulfur Composite 2

The carbon nanotube-sulfur composite was prepared by the same method as Example 1, except that 30 g of the carbon nanotube aggregate having the adjusted size and 70 g of the sulfur powder were mixed. The carbon nanotube-sulfur composite having the average particle diameter of 10 micrometers was obtained by performing preparation as described above.

<Preparation Example 3> Preparation of Carbon Nanotube-Sulfur Composite 3

The carbon nanotube-sulfur composite was prepared by the same method as Example 1, except that 10 g of the carbon nanotube aggregate having the adjusted size and 90 g of the sulfur powder were mixed. The carbon nanotube-sulfur composite having the average particle diameter of 10 micrometers was obtained by performing preparation as described above.

Comparative Preparation Example 1

After sulfur and Super-P as the conductive material were mixed at a wt % of 9:1, ball milling was performed under the condition of 1 hr/500 rpm to prepare the composite and thus obtain the composite having the average particle diameter of 10 micrometers.

Example 1

The carbon nanotube-sulfur composite prepared in Preparation Example 2 was used as the positive electrode active material, Denka black was used as the conductive material, and SBR (styrene butadiene rubber) and CMC (carboxymethyl cellulose) were added as the binder to prepare the positive electrode slurry. In this case, the composite, the conductive material, and the binder were mixed at the content ratio of 75:0:5 wt % to prepare the positive electrode slurry, and the slurry was applied so that the sulfur content in the electrode was 3 $mAh/cm^2$ to manufacture the positive electrode.

The lithium metal foil was used as the negative electrode, and the polypropylene sheet was used as the separation membrane. As the electrolytic solution, 0.1 M LiTFSI salt (lithium bis-(trifluoromethane sulfonyl)imide salt) was added to the solvent where tetraethyleneglycol dimethyl ether, 1,2-dimethoxyethane, and 1,2-dioxane were mixed at the ratio of 1:1:1 to manufacture the battery.

Example 2

The lithium-sulfur battery was manufactured by performing the same method as Example 1, except that the carbon nanotube-sulfur composite used in Example 1 was used as the carbon nanotube-sulfur composite prepared in Preparation Example 3.

Comparative Example 1

The lithium-sulfur battery was manufactured by performing the same method as Example 1, except that the carbon nanotube-sulfur composite used in Example 1 was used as the Super-P-sulfur composite prepared in Comparative Preparation Example 1.

Experimental Example 1

The initial charging/discharging capacity of the battery manufactured in Example 1, Example 2, and Comparative Example 1 was measured. Charging and discharging c-rates were 0.1 c, measurement was performed at room temperature, and FIG. 8 illustrates measurement values. Discharging capacities were compared while adjusting the sulfur content in the electrode to 3 $mAh/cm^2$.

Hereinafter, a description will be given with reference to the drawings.

FIGS. 3 and 4 are images obtained by photographing the carbon nanotube aggregate by a scanning electron microscope (SEM).

FIG. 5 is a photographed image of a carbon nanotube-sulfur composite having a shape of FIG. 1-*a*) obtained by a scanning electron microscope (SEM) and an energy dispersive spectroscopy (EDS).

Specifically, FIG. 5*a*) illustrates the SEM images of the initial carbon nanotube aggregate (left) and carbon nanotube-sulfur composite (right) before the composite having the size of about 500 micrometers is formed. Even though sulfur is applied on the carbon nanotube aggregate by a capillary phenomenon, a phenomenon where pores are maintained in the carbon nanotube aggregate can be confirmed. FIG. 5*b*) illustrates a cross-section of FIG. 5*a*). FIG. 5*c*) illustrates a cross-section of the carbon nanotube-sulfur composite where sulfur is impregnated in the carbon nanotube aggregate. FIG. 5*d*) illustrates an EDS measurement image of the cross-section of the composite of FIG. 5*c*).

FIG. 6 is a SEM image of the carbon nanotube-sulfur composite, and illustrates that sulfur is uniformly applied on the carbon nanotube aggregate by the capillary phenomenon.

FIG. 7 is a SEM image of carbon nanotube-sulfur composites prepared in Preparation Examples 1 to 3. It can be confirmed that the degrees of impregnation of sulfur in the carbon nanotube in the carbon nanotube-sulfur composite are different from each other according to the ratio of the carbon nanotube aggregate and the sulfur. Particularly, it can be confirmed that in the carbon nanotube-sulfur composite prepared in Preparation Example 3, sulfur covers the carbon nanotube aggregate to the extent that the carbon nanotube aggregate is not seen.

FIG. 8 is a table obtained by measuring a discharging capacity of a lithium-sulfur battery including composites prepared in Preparation Example 1, Preparation Example 2, and Comparative Example 1 as a positive electrode.

As illustrated in FIG. 8, it can be seen that the lithium-sulfur battery including the carbon nanotube-sulfur composite prepared in Preparation Examples 1 and 2 has the discharging capacity that is significantly superior to the discharging capacity of the lithium-sulfur battery including the composite prepared in Comparative Example 1 as the positive electrode. Accordingly, the carbon nanotube-sulfur composite according to the exemplary embodiment of the present application may have an excellent effect in the lithium-sulfur battery.

Although the exemplary embodiments of the present application are described with reference to the accompanying drawings, the present application is not limited to the exemplary embodiments but may be manufactured in different forms, and it will be apparent to those skilled in the art that various modifications and changes may be made thereto without departing from the essential feature of the application. Therefore, it should be understood that the above exemplary embodiments are illustrative only but are not limitative in all aspects.

The invention claimed is:

1. A positive electrode, comprising:
(1) a current collector; and (2) a mixture applied to the current collector; said mixture comprising:
(a) a carbon nanotube-sulfur composite comprising:
a carbon nanotube aggregate; and
sulfur or a sulfur compound positioned on an external surface and in an inside of the carbon nanotube aggregate,
wherein a tap density of the carbon nanotube aggregate is 0.27 g/cc or more and 1 g/cc or less; and
(b) a binder,
wherein the carbon nanotube-sulfur composite is attached to the current collector through the binder, and
wherein the carbon nanotube aggregate has a porosity of 10% or more and 70% or less based on a total volume of the aggregate, said porosity is achieved by including a metal catalyst or a metal oxide catalyst in a content of 0.1 wt % or more and 10 wt % or less based on the total weight of the carbon nanotube aggregate.

2. The positive electrode of claim 1, wherein sulfur or the sulfur compound is positioned in a region of less than 100% of the entire external surface of the carbon nanotube aggregate.

3. The positive electrode of claim 1, wherein in the carbon nanotube-sulfur composite, a content ratio of the carbon nanotube aggregate and sulfur or the sulfur compound is 10 to 50:50 to 90 based on wt %.

4. The positive electrode of claim 1, wherein a diameter of the carbon nanotube aggregate is 500 micrometers or less.

5. A lithium-sulfur battery comprising:
a positive electrode for a lithium-sulfur battery according to claim 1;
a negative electrode; and
a separation membrane positioned between the positive electrode and the negative electrode.

6. The positive electrode of claim 1, wherein the metal catalyst is at least one selected from the group consisting of Fe, Ni, Co, Cr, Ni/Ti, Co/Ti and Fe/Ti, and wherein the metal oxide catalyst is at least one selected from the group consisting of $Fe_2O_3$, $Al_2O_3$, and CuO.

7. A method for preparing a carbon nanotube-sulfur composite, comprising:
impregnating sulfur or a sulfur compound on an external surface and in an inside of a carbon nanotube aggregate,
wherein the impregnating of sulfur or the sulfur compound is performed by mixing the carbon nanotube aggregate and sulfur or sulfur compound powder to form a mixture, and then heating the mixture to impregnate molten sulfur or sulfur compound in the carbon nanotube aggregate,
wherein a heating temperature is 115° C. or more and 180° C. or less, and
wherein a tap density of the carbon nanotube aggregate is 0.01 g/cc or more and 1 g/cc or less.

8. The method of claim 7, wherein sulfur or the sulfur compound is positioned in a region of less than 100% of the entire external surface of the carbon nanotube aggregate.

9. The method of claim 7, further comprising:
adjusting a size of a diameter of the carbon nanotube aggregate to 50 micrometers or less before, after, or before and after the impregnating of sulfur or the sulfur compound.

10. The method of claim 9, wherein in the adjusting of the size, the diameter of the carbon nanotube aggregate is adjusted to 1 micrometer or more and 10 micrometers or less.

11. The method of claim 9, wherein the adjusting of the size is performed by using a dry ball mill method, a dry jet mill method, or a dry Dyno mill method.

12. The method of claim 9, wherein after the adjusting of the size, the carbon nanotube aggregate has a porosity of 10% or more and 70% or less based on a total volume of the aggregate.

13. The method of claim 7, wherein a content ratio of the carbon nanotube aggregate and sulfur or the sulfur compound is 10 to 50:50 to 90 based on wt %.

14. The method of claim 7, wherein the mixture is formed by dissolving sulfur or the sulfur compound in an organic solvent, and then adding the carbon nanotube aggregate to grow sulfur or the sulfur compound.

15. The method of claim 7, wherein the mixture is formed by mixing the carbon nanotube aggregate and sulfur or sulfur compound powder, and then performing impregnating by a ball mill method.

16. The method of claim 7, further comprising:
preparing the carbon nanotube aggregate (S01) before the impregnating of sulfur or the sulfur compound,
wherein the preparing of the carbon nanotube aggregate (S01) includes preparing a carbon nanotube, and in the preparing of the carbon nanotube, a catalyst amount is 0.1% to 10% based on a total weight of the generated carbon nanotube.

* * * * *